Oct. 30, 1951 E. E. KENT 2,573,202
BAIT BOX
Filed April 24, 1947
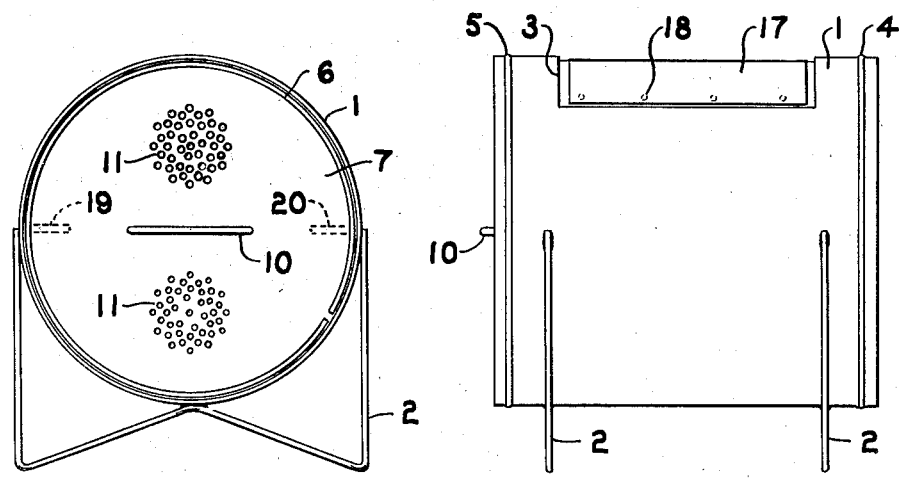
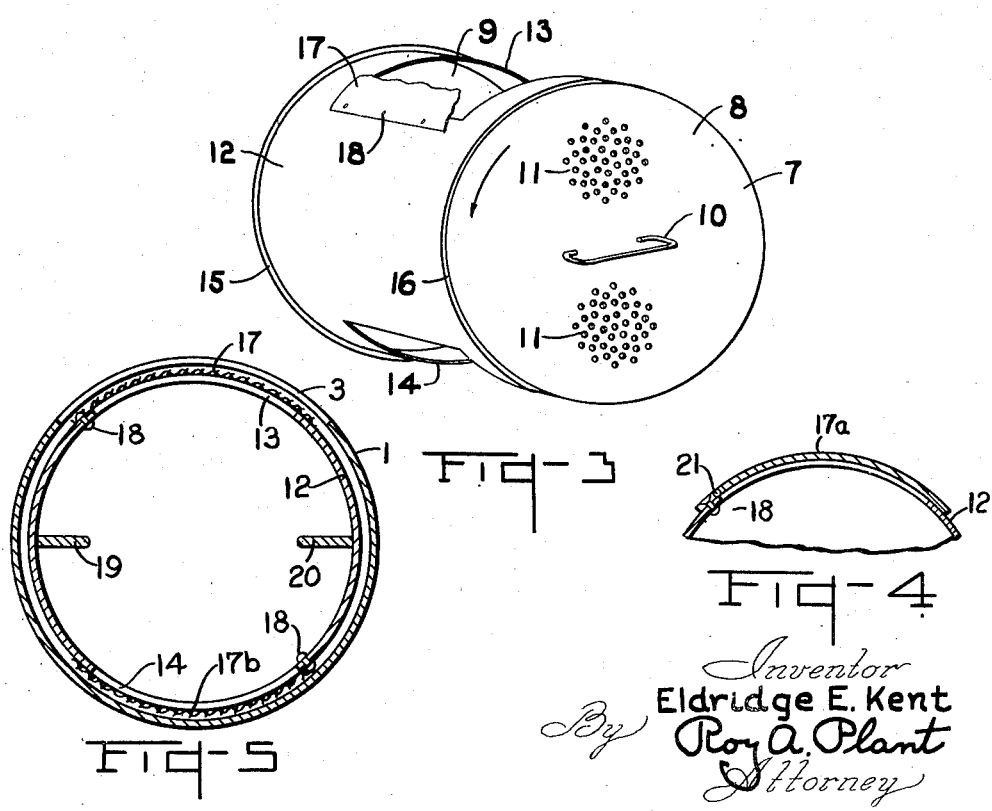
Inventor
Eldridge E. Kent
By Roy A. Plant
Attorney Patented Oct. 30, 1951

2,573,202

UNITED STATES PATENT OFFICE 2,573,202

BAIT BOX

Eldridge E. Kent, Battle Creek, Mich.

Application April 24, 1947, Serial No. 743,617

5 Claims. (Cl. 43—55)

1

The present invention relates broadly to containers, and in its specific phases to a fishermen's bait box particularly suited for use with worms.

Fishing is an international pastime and live worms or other similar live bait are very commonly used by fishermen. Ordinarily worms for fishing use are placed in an open top pail or can containing damp earth, saw dust, or moss. Under these conditions the worms gradually work their way to the bottom of the container where they tend to ball up, a situation which makes it difficult to fish out a worm for use when desired. To overcome this condition it is quite common practice to rotatably shake the can and its contents with a view to trying to bring some of the worms to the top, and it has even been proposed to use a rotary metal comb member to drag through the dirt and pull the worms to the surface. This latter procedure is harsh and liable to injure or even pull the worms in two. It was a recognition of the difficulties and peculiarities of this problem, as well as the shortcomings of the prior attempts to solve same, which led to the conception and development of the present invention.

Accordingly among the objects of the present invention is the provision of a bait box for worms wherein the worms may be brought to the top of a body of damp earth or saw dust without injury.

Another object is to provide a bait box for worms, said box being mounted on short legs so that if a small amount of water gets in the bottom of the fishing boat it will not drown the worms.

Another object is to provide a bait box which has a rotatable inner container for worms or the like, said container having a handle for rotating same.

Another object is to provide a bait box housing having a top opening, and to provide such housing with a rotatable inner container having upper and lower openings, each of which does not exceed one quarter of the circumference of the container and is a little smaller than the top opening of the housing.

A further object is to provide a separate cover flap for each of the openings on the inner container, said flaps being fastened symmetrically to the corresponding edge of the inner container openings, said edge being the leading edge as the inner container is rotated.

A further object is to provide means for anchoring the inner container in the outer container for rotation therein, said outer container

2 being either open at both ends or closed at one end.

A further object is to provide means for ventilating the inner container.

Still further objects and advantages of the invention will appear as the description proceeds.

To the accomplishment of the foregoing and related ends, the invention, then consists of the means hereinafter fully described and particularly pointed out in the claims, the annexed drawing and the following description setting forth in detail certain means for carrying out the invention, such disclosed means illustrating, however, but one of various ways in which the principle of the invention may be used.

In the annexed drawing:

Figure 1 shows an elevational side assembly view of a preferred form of the present invention.

Figure 2 shows an elevational end assembly view of the present invention as seen from the left hand side of Figure 1.

Figure 3 shows a fragmentary perspective view of a preferred form of the rotatable inner container of the assembly shown in Figures 1 and 2.

Figure 4 shows a fragmentary view illustrating the use of a metal cover and hinge for closing an opening in the rotatable inner container.

Figure 5 shows a transverse center section illustrating the relative positions of the housing and the rotatable inner container with its cover members.

Referring more particularly to the drawing it will be noted that the assembly has a housing 1 which is preferably mounted on legs 2. For simplicity of construction these legs may be made of wire bent as shown to elevate housing 1, and spot welded or soldered in place to the latter in accordance with conventional practice. An opening 3, which is preferably rectangular, is provided at the top of the housing, and this opening should be amply large for the insertion of the fisherman's hand and normally would extend approximately one quarter of the circumference of the housing. While housing 1 may be closed at one end and open at the other, a simplified construction involves forming an open ended tubular housing with outwardly projecting annular ribs 4 and 5 which are correspondingly hollow on the inner face of the housing and form grooves. Snap rings 6 may may be used in each of these grooves to hold a rotatable inner container 7 in place in the housing. That inner container would normally be slightly shorter than the space between ribs 4 and 5 and of an outer diameter such that same would be held in place by snap rings 6. On at least one of the two end members 8 and 9 of inner container 7 is a handle 10 which is used for rotating the inner container in the direction shown by the arrow. Small perforations 11 may be placed in end members 8 and 9 to aerate the contents of the container as well as to help ventilate same in case the container happens to be setting partially or wholly in the sun.

On diametrically opposite sides of the cylindrical wall member 12 of inner container 7 are openings 13 and 14. These openings are preferably rectangular in shape with each extending a little less than one quarter of the circumference of the inner container so that with the inner container rotated until the openings are at opposite edges of opening 3, there will be a solid portion of cylindrical wall member 12 completely undercovering that opening. This is the normal position of the assembly when same is being transported from place to place.

Recognizing that under conditions of use inner container 7 will normally be filled approximately three-fourths to seven-eighths full of a material such as moist earth, or saw dust, means will be required to keep same from spilling out into housing 1 as well as injuring the worms when inner container 7 is rotated. To take care of this a preferred construction of the inner container involves placing circumferential outwardly projecting ribs 15 and 16 substantially at the ends of same so as to reduce rotation friction and at the same time provide clearance over openings 13 and 14. Fastened to the cylindrical wall member 12 of the inner container 7 along one longitudinal edge of opening 13 is an opening cover member 17, Figure 1, such cover member being fragmentarily shown in Figure 3 for clarity of illustration. Where this member 17 is made of canvas it may be anchored in place by means of rivets 18. On the other hand a metal cover member may be used and in such case the cover member 17a will be fastened in place by means of a hinge 21 utilizing rivets 18, as shown in Figure 4. Opening 14 would likewise be provided with a cover member 17b, the trailing end of which is omitted in Figure 3 to facilitate illustration of the details of the inner container. The hinging of this second cover is located 180° around cylindrical wall member 12 from the hinge of cover member 17 over opening 13 as shown in Figure 5 to facilitate operation as described.

In actual use inner container 7 of the assembly shown in Figures 1 and 2 would be rotated so that one of its openings would be up, whereupon cover member 17, which is wider than either of the inner container openings 13 or 14 and narrower than opening 3 in housing 1, would be turned back so that the assembly would be open. Moist earth, saw dust, or other suitable material, would then be placed in the inner container until approximately three-fourths to seven-eighths full, the actual amount used depending largely upon the quantity of worms to be placed in the container. Following dropping the worms onto this filling material, cover member 17 would be returned to closed position to overlap the sides of opening 13 or 14 and slightly extend over the far end of same. The inner container can then be turned 90° so that the flap covered openings will be at opposite sides of the container, and a solid intermediate portion of the cylindrical wall member 12 will underlie opening 3. The assembly is then in condition for transporting to a point of use.

When the bait box is placed in the boat the inner container is preferably rotated another 90° so that one of the flap covered openings is up. The worms will then normally work their way to the bottom of the container in accordance with their standard habits. To reduce sliding of the filling material and worms in the inner container during its rotation, a pair of inwardly projecting ribs 19 and 20 may be installed in same as shown in Figure 2. Then when the fishermen are ready to bait their hooks it is only necessary for them to rotate the inner container 180° so that the bottom of same becomes the top. By pulling back flap 17 it will be found that the worms which have worked their way to the bottom are now on the top ready to be picked up and used for bait purposes. After removing the worm to be used as bait, cover 17 may be returned to closed position, and if the container is left undisturbed, the worms will once more work their way to the bottom ready for use again upon rotating the inner container 180°. However once the worms have been brought to the top for use it is an easy matter to again rotate the inner container 180° which will place the worms once more on the bottom where they will stay and be ready for rotatably bringing to the top again the next time a worm is wanted. This procedure takes advantage of the worm's habit to work to the bottom of a bait can, makes it possible to remove them without injury, and at the same time allows the fisherman a choice of the worms which are available.

Other modes of applying the principle of my invention may be employed instead of the one explained, change being made as regards the apparatus herein disclosed, provided the means stated by any of the following claims or the equivalent of such stated means be employed.

I therefore particularly point out and distinctly claim as my invention:

1. A fisherman's portable bait box, which comprises a small substantially cylindrical housing which has an opening at least in one end and an inlet opening in the cylindrical wall thereof, a substantially cylindrical inner container closely but rotatably fitting inside of said housing, said inner container having diametrically opposite openings in its cylindrical wall, said openings being a little smaller than said opening in the cylindrical wall of said housing and adapted to underlie the same, openable cover means for each of said openings in the inner container, an operating handle means fastened to said inner container and extending through said end opening of said housing, and means carried by the cylindrical wall of the housing adjacent opposite ends engageable with opposite ends of said container for holding said inner container in said housing.

2. A fisherman's portable bait box, which comprises a small substantially cylindrical housing which has an opening at least in one end and an inlet opening in the cylindrical wall thereof, a substantially cylindrical inner container closely but slidably fitting inside of said housing for rotation therein, said inner container being recessed over a large portion of its cylindrical wall to provide clearance and having diametrically opposite openings in the recessed portion of its cylindrical wall, said openings being a little smaller than said opening in the cylindrical wall of said housing and adapted to underlie the same, openable cover means for each of said openings in the inner container, and handle means extending through said end opening for rotating said inner container in said housing.

3. A fisherman's portable bait box, which comprises a small substantially cylindrical housing which has an inlet opening in the cylindrical wall thereof, said inlet opening being large enough for the insertion of a fisherman's fingers, a substantially cylindrical inner container closely but rotatably fitting inside of said housing, said inner container having diametrically opposite openings in its cylindrical wall, said openings being a little smaller than said opening in the cylindrical wall of said housing and adapted to underlie the same, openable cover means for each of said openings in the inner container, means providing clearance between said cover means and said housing to facilitate rotation of said inner container, and means for supporting said housing in elevated position with said inlet opening normally upward.

4. A fisherman's portable bait box, which has a small open ended housing with an inlet opening in its cylindrical wall, an invertible inner container rotatably fitting said housing, means at each end of said housing for holding said inner container therein, handle means mounted on one end of said inner container and extending out of said housing, said inner container having oppositely directed openings within said housing, and closable means for each of said openings, said closable means being fastened to said invertible container in manner facilitating inversion of same as well as ingress thereinto through the inlet in said housing when either of said openings in the invertible container is under the inlet opening of said housing.

5. A fisherman's portable bait box, which comprises a small substantially cylindrical housing which has an inlet opening in the cylindrical wall thereof, a substantially cylindrical inner container closely but slidably fitting inside of said housing for rotation therein, said inner container having outwardly projecting ribs on the edges of its periphery, and diametrically opposite openings in said periphery, said openings being a little smaller than said opening in the outer housing and adapted to underlie the same, openable cover means for each of said openings in the inner container, said cover means being hinged to the periphery of said inner container between said ribs to provide suitable clearance during rotation of said inner container, means carried by the cylindrical wall of the housing adjacent opposite ends engageable with opposite ends of said container for holding said inner container in said housing, means freely extending out of one side of said housing for rotating said inner container in said housing, and means for supporting said housing in elevated position with said inlet opening normally upward.

ELDRIDGE E. KENT.

REFERENCES CITED

The following references are of record in the file of this patent:

UNITED STATES PATENTS

| Number | Name | Date |
| --- | --- | --- |
| 62,468 | Boynton | Feb. 26, 1867 |
| 212,064 | Spencer | Feb. 4, 1879 |
| 503,722 | Lewis et al. | Aug. 22, 1893 |
| 575,621 | Smith et al. | Jan. 19, 1897 |
| 1,111,946 | Byrd | Sept. 29, 1914 |
| 1,795,315 | Quest | Mar. 10, 1931 |
| 2,028,825 | Christensen | Jan. 28, 1936 |
| 2,194,009 | Conner | Mar. 19, 1940 |
| 2,293,432 | Friedman | Aug. 18, 1942 |
| 2,408,902 | Beckstrom | Oct. 8, 1946 |
| 2,478,621 | Attula | Aug. 9, 1949 |